United States Patent [19]

Little

[11] 4,221,663
[45] Sep. 9, 1980

[54] MULTIPLE PLATE FILTER APPARATUS

[75] Inventor: Frank Little, Au Gres, Mich.

[73] Assignee: The Harshaw Chemical Company, Cleveland, Ohio

[21] Appl. No.: 949,141

[22] Filed: Oct. 6, 1978

[51] Int. Cl.² .................. B01D 39/08; B01D 25/02; B01D 29/34
[52] U.S. Cl. .................. 210/193; 210/238; 210/242 R; 210/344; 210/345; 210/347; 210/486
[58] Field of Search .......... 210/238, 241, 242 R, 210/332, 345–347, 486, 487, 506, 343, 344, 193

[56] References Cited

U.S. PATENT DOCUMENTS

| | | | |
|---|---|---|---|
| 598,007 | 1/1898 | Prevet | 210/345 |
| 2,002,826 | 5/1935 | Moran | 210/346 |
| 2,278,453 | 4/1942 | Kracklauer | 210/344 X |
| 2,313,612 | 3/1943 | Alsop | 210/343 |
| 2,508,976 | 5/1950 | Tessmer, Sr. | 210/346 X |
| 2,582,311 | 1/1952 | Creswick et al. | 210/346 X |
| 2,615,574 | 10/1952 | Kracklauer | 210/347 |
| 2,697,524 | 12/1954 | Foust | 210/346 |
| 2,821,305 | 1/1958 | Anderson | 210/347 X |
| 3,019,905 | 2/1962 | Baker et al. | 210/347 X |
| 3,083,834 | 4/1963 | Pall | 210/343 X |
| 3,294,241 | 12/1966 | Sicard et al. | 210/347 X |
| 3,537,592 | 11/1970 | Ogden et al. | 210/343 |
| 3,542,206 | 11/1970 | Geister | 210/486 |
| 3,606,735 | 9/1971 | Baigas, Jr. | 210/506 X |

FOREIGN PATENT DOCUMENTS

| | | | |
|---|---|---|---|
| 480207 | 4/1953 | Italy | 210/347 |
| 919470 | 2/1963 | United Kingdom | 210/346 |

Primary Examiner—Robert H. Spitzer
Attorney, Agent, or Firm—Watts, Hoffmann, Fisher & Heinke Co.

[57] ABSTRACT

A multiple-plate filter apparatus characterized by a plurality of individual filter units, each having dual filtering surfaces. The filtering surfaces are defined in part by bags made of plastic cloth. During the cleaning cycle, a flotation collar raises the filter unit assembly to the top of the tank so that the individual units can be retrieved without reaching into the solution.

8 Claims, 12 Drawing Figures

MULTIPLE PLATE FILTER APPARATUS

BACKGROUND OF THE INVENTION

The present invention relates generally to liquid filtering apparatus, and more specifically to multiple plate filter apparatus, preferably of the horizontal type, useful for filtering electroplating solutions and the like.

A conventional horizontal multiple plate filter apparatus used in the electroplating art is disclosed in U.S. Pat. No. 3,387,711. The patented apparatus is characterized by a plating filter tank with a stacked arrangement of horizontal, annular filtering units. Each unit has a single filtering surface formed by a bi-layer screen consisting of one layer of plastic and one layer of cloth. These layers are held in place by a clamping member which fits into a recess in the filter unit. When the unit is assembled, the screen is positioned over the filter unit and the clamping member is fitted over the screen and inserted into the groove to hold the screen in place. During the cleaning cycle, it is necessary to reach into the plating solution from the top of the tank to retrieve the filter units.

SUMMARY OF THE INVENTION

The present invention provides a new multiple-plate filter apparatus characterized by improved filtering efficiency compared to the conventional horizontal plate filters. The new apparatus is further characterized by a unique light-weight, all-plastic, non-corrosive construction which facilitates maintenance operations by making it easy to replace or clean the individual modular filter units.

The filter apparatus of the invention comprises a tank, a plurality of dual-sided, modular filter units stacked in the tank, each of the units having parallel, spaced filtering surfaces, spacers interposed between the filter units and having a mesh surface that confronts and provides support over the filtering surface of an adjacent unit, and outlet means extending through the filter units for receiving the filtrate from each unit and conducting it to the outlet port of the tank.

In a more preferred embodiment of the invention, each of the filter units comprises a plate having a central opening, slots extending radially from the opening, mesh extending over the faces of the plate, and flexible filter material which covers and is supported by the mesh to define the dual filtering surfaces. The flexible filter material serves to hold filter media or filter aid material against the upper and lower surfaces of each modular filter unit. In use, the liquid to be filtered is introduced into the tank around the assembly of filter units and spacers. The liquid enters the spacers through the inlet openings in their outer peripheries and is directed into the filter units above and below each spacer. The liquid in the filter units passes through the filter material and the underlying mesh to enter the slots of the plates which conduct the filtrate toward the centers of the units where the filtrate enters the outlet means.

An important feature of the invention is the modular filter unit construction which provides the dual filtering surfaces. By filtering through top and bottom surfaces of each modular unit, the effective filter area is doubled compared to the one-sided horizontal filters of the prior art. The improved filtering efficiency makes it possible to treat filter gallonages of from 2000 to 10,000 gallons per hour using filter units of a single diameter arranged in assemblies of any desired length or height. With the one-sided horizontal filters of the prior art, it was necessary to manufacture and inventory plates of several diameters in order to accommodate a wide range of filter gallonages.

Another feature of the invention resides in making the flexible filter material of the modular units in the form of easily removable bags. Each bag has a wide mouth sized to receive the filter plate and an elastic band around the lip of the mouth. Two bags are used in each dual-sided filter unit, one covering the top surface and one covering the bottom surface. The bags can be easily slipped over the plates and held in place without the need for clips or other fasteners that have been conventional in the art.

A further feature of the invention resides in the provision of a flotation collar which is located in the tank below the assembly of filter units and spacers. A locking arrangement is provided at the top of the filter assembly to hold it in operative position. When this locking structure is released during cleaning operations, the flotation collar or ring automatically elevates the filter assembly in the tank to bring each filter unit to the top where it can be easily and safely cleaned. Maintenance personnel do not have to reach down into a plating solution to retrieve the filter plates as is required with conventional apparatus.

Further advantages and a fuller understanding of the invention will be had from the following detailed description and the accompanying drawings.

DESCRIPTION OF THE PREFERRED EMBODIMENT

Figure 1:
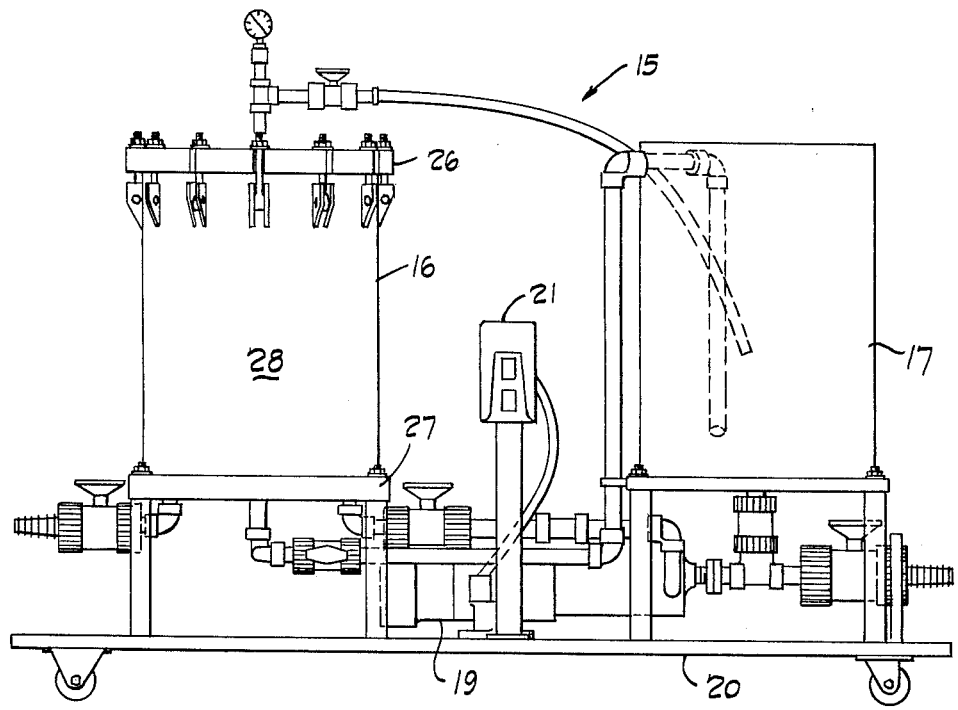
FIG. 1 is a schematic illustration of a portable fluid filtering apparatus embodying the present invention.

Referring now to the drawings, and FIG. 1 in particular, a filtering system incorporating the improved filter assembly of the invention is generally designated by reference numeral 15. The illustrated filtering system 15 is especially adapted for use on an industrial electroplating line, but it will be understood from the following description that features of the invention have applicability to other filtering systems and uses.

The filtering system 15 is generally comprised of a tank 16 in which the plating solution or other liquid is filtered and a tank 17 which contains a slurry of a conventional filter media, such as diatomaceous earth or the like. The tanks 16, 17 are connected by a conduit system 18 which includes a motor actuated pump 19. As will be described in greater detail, the pump 19 is operated to circulate plating solution between a bath (not shown) and the tank 16 and also to pump filter media slurry from the tank 17 to the tank 16 where the filter media aids in the filtering action.

In the illustrated arrangement, the tanks 16, 17 are mounted on a cart 20 which can be moved from one plating tank to another. The system controls including a starter motor 21 for activating the pump 19 are located on the cart 20.

Figure 2:
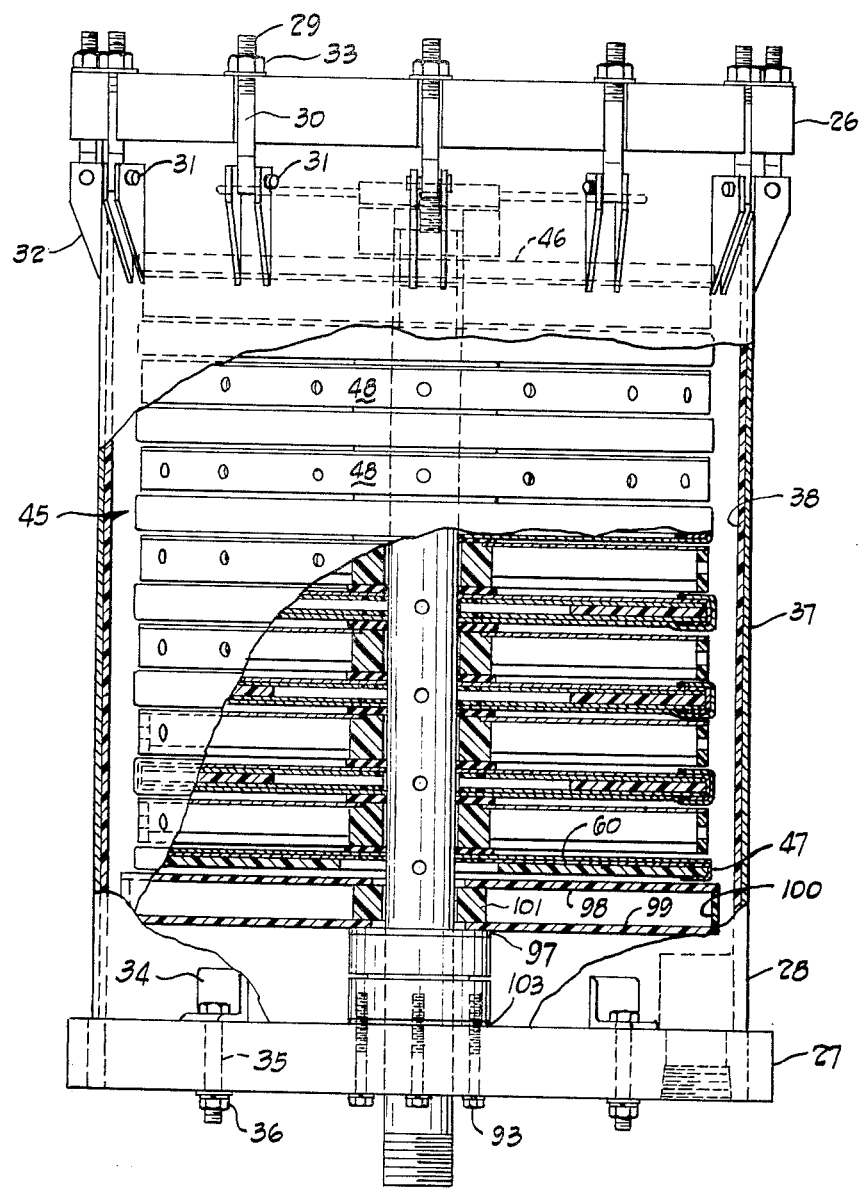
FIG. 2 is a partially sectional view of an improved multiple plate filter assembly positioned in a filter tank.
Figure 3:
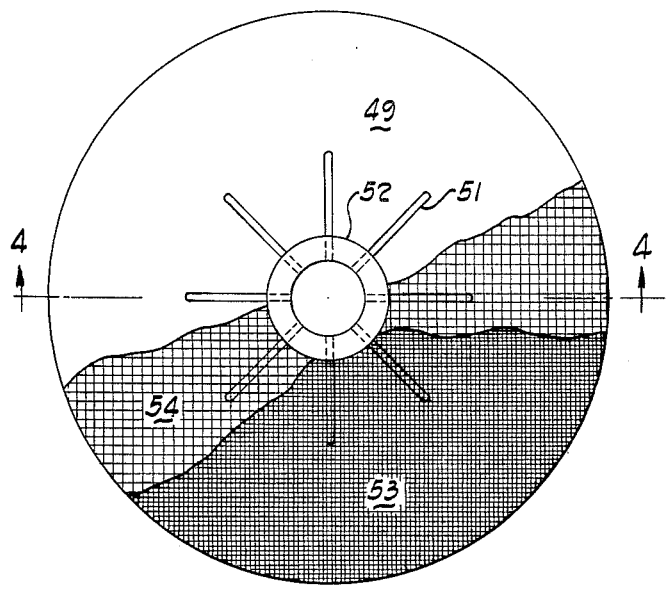
FIG. 3 is a top view of an improved filtering unit constructed according to the present invention with a mesh structure partially broken away.
Figure 4:
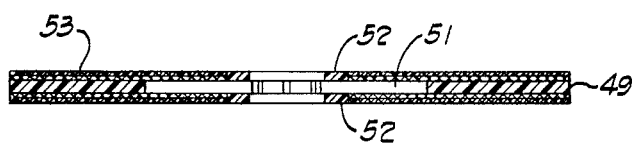
FIG. 4 is a sectional view of the filter element as seen along line 4—4 in FIG. 3.

As shown most clearly in FIG. 2, the filter tank 16 includes a cover plate 26, a base plate 27, and a cylindrical wall 28. The cover plate 26 is releasably held in place by threaded studs 29 which extend upwardly through slots 30 in the outer edge of the cover. The studs 29 are hingedly mounted by pins 31 carried in brackets 32 around the outside of the wall 28. Nuts 33 are threaded on the upper ends of the studs 29 against the top of the cover 26. When the cover is to be moved, the nuts 33 are threaded from the studs 29 and the studs are swung outwardly from the slots 30. The base plate 27 is attached to flanges 34 on the wall 28 by suitable connectors, such as bolts 35 and cooperating nuts 36. The wall 28 is shown as comprising a stainless steel jacket 37 having a lining 38 made of an acid-resistant material such as polyvinylchloride or the like.

An improved filter assembly 45 constructed in accordance with the present invention is located inside the filter tank 12. The assembly 45 is generally comprised of a series of annular filter units 46, 47 which are separated by spacer members 48. The filter units 46 are uniquely characterized in that each has top and bottom filtering surfaces which actively filter foreign matter from the liquid as it is pumped through the tank.

The preferred construction of the filtering units 46 is most clearly shown in FIGS. 3-6. The illustrated construction comprises an annular plate 49 made from a suitable plastic material, such as polypropylene or the like. The plate 49 has a center opening 50 and a plurality of radially extending slots 51. The slots extend from the center opening 50 to a location between the inner and outer edges of the plate.

A hub or ring 52 is welded to the center portion of each face of the plate 49 around the center opening 50. Two layers of plastic mesh 53, 54 formed of expanded polypropylene or the like extend over each face of the plate 49 around the hub 52. In a preferred construction, the outer layers 53 are of a finer mesh size than the inner layers 54. The double layers of mesh 53, 54 are suitably secured, as by tack welding, to the outside of the hubs 52.

The filter unit construction 46 further includes a pair of identical filter bags 60, 61 enclosing the plate and mesh structure 49, 53, 54. These bags serve to hold the filter media deposited from the tank 17 against the upper and lower surfaces of the filter units 46. The bags 60, 61 which are made from a flexible, acid-resistant, permeable material such as polypropylene cloth or the like provide upper and lower filtering surfaces. In their preferred form shown in FIG. 6, each bag is dish shaped with a circular wall 62 that is coextensive with a face of the plate 49 and a central opening 63 of the same size as the center opening 50 of the plate. A gum washer 64 is sewed to the outside face of the bag around the opening 63. Each bag has a marginal lip 65 around the wall 62 which defines a mouth to the bag and is adapted to extend around and grip the edge of the plate 49. The marginal lip 65 carries an acid-proof elastic band 66.

Figure 5:
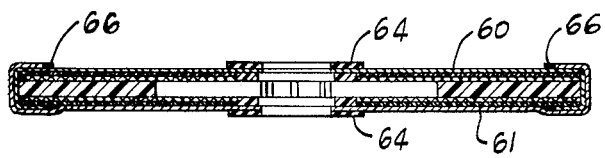
FIG. 5 is a sectional view of the filter unit of FIG. 4 with two filter bags in place to provide two filtering surfaces.

As shown in FIG. 5, the bag 60 covers the mesh 53, 54 on the upper face of the plate 49. The marginal lip 64 of the bag 60 extends around the outer edge of the plate 49 so that the elastic band 66 is positioned at the underside of the plate to hold the bag in position. The other bag 61 covers the mesh 53, 54 on the lower face of the plate. The marginal lip 65 of the bag 61 overlies the bag 60 and extends around the edge of the plate to its upper side.

The described filter bags 60, 61 can be easily slipped over and removed from the plate and mesh structure 49, 53, 54. The improved construction including the elastic band around the mouth of the bag eliminates the clips or other fasteners that have been conventional in the art. When the bags are in place, the relative fine mesh 53 supports the flexible material of the bag while the relative coarse mesh 54 permits liquid flow through the filter units into the slots 51.

Figure 11:
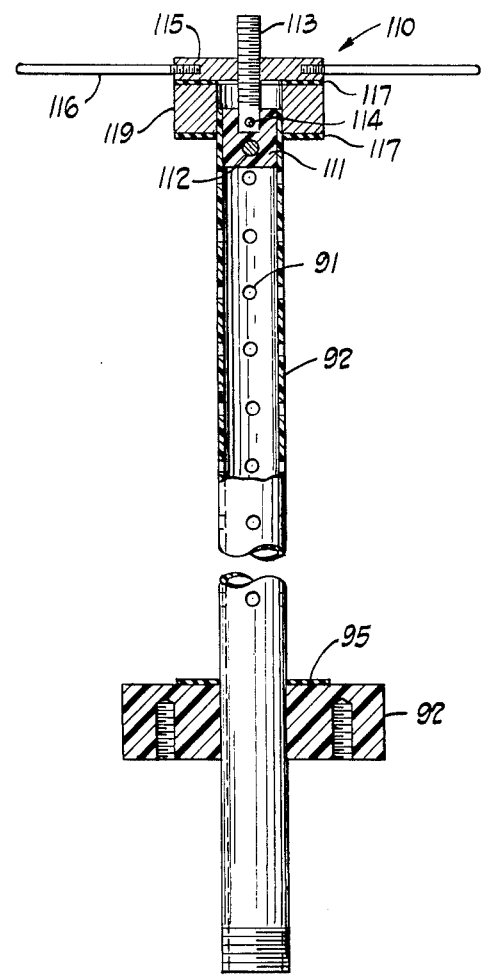
FIG. 11 is a cross-sectional view of an outlet pipe assembly used to eject fluid from the filter tank.
Figure 6:
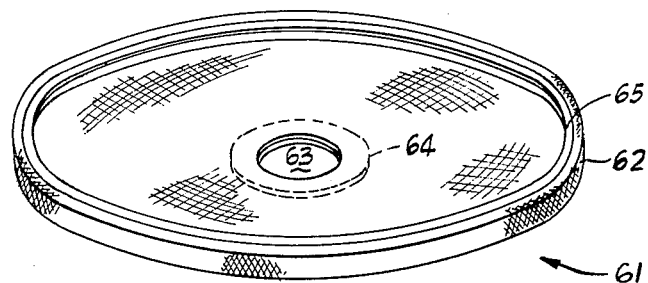
FIG. 6 is an elevational view of a filter bag designed to fit over the filter units.
Figure 7:
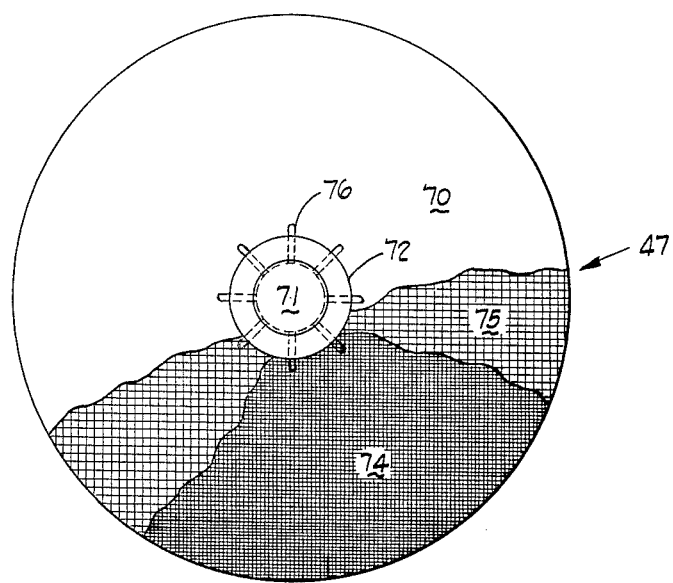
FIG. 7 is a top view of a bottommost filter unit with mesh structure broken away.
Figure 8:
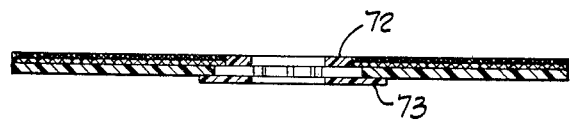
FIG. 8 is a cross-sectional view of the bottommost filter unit shown in FIG. 7.
Figure 10:
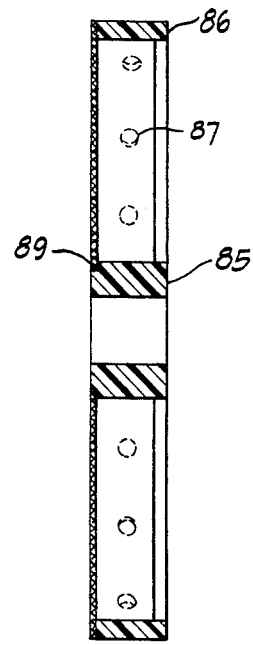
FIG. 10 is a sectional view of the spacer element as seen along line 10—10 in FIG. 9.

The filter unit 47 is the lowermost unit in the assembly 45. The construction of this unit is shown in FIGS. 10, 11 to comprise a circular plate 70 having a center opening 71. A small diameter hub ring 72 is welded to the upper surface of the plate around the opening 71 and a larger diameter hub ring 73 is welded to the bottom surface of the plate. Two layers of mesh, 74, 75, which are similar to the mesh layers 53, 54, respectively, are carried on the upper face of the plate 70 and are spot welded to the outside of the smaller hub ring 72. A number of circularly spaced slots or notches 76 are cut through the inner edge of the plate 70 to extend radially from its center opening 71. The slots 76 extend from beneath the hub ring 72 and terminate a short distance beyond its outer periphery. A filter bag 60 (FIG. 2) is placed over the plate and mesh structure 70, 74, 75 in the same manner as the bags 60 of the filter units 46.

Figure 9:
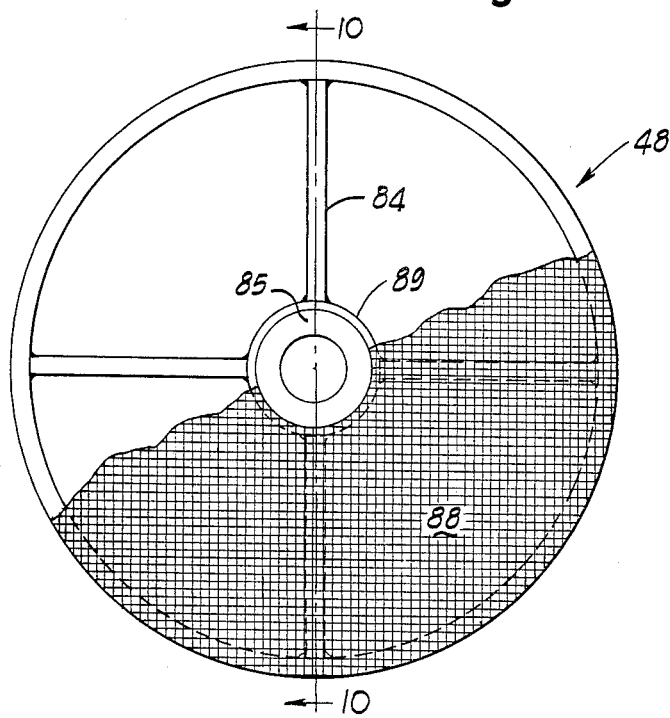
FIG. 9 is a top view of a spacer element which comprises a portion of the plating apparatus with a mesh layer broken away.

The construction of the spacer members 48 is illustrated in FIGS. 9 and 10. Each spacer is made of a suitable acid-resistant plastic, such as polypropylene and comprises a hub 85, a concentric outer rim 86 formed with circumferentially spaced holes 87, and radial ribs 84 which are welded to and extend between the hub 85 and the outer rim 86. An annular grid 88 of expanded polypropylene or the like forms one face of the spacer construction. The grid 88 overlies and is welded to the rim 86. The inner periphery of the grid 88 is seated in a shoulder 89 formed in the end of the hub 85 and is welded thereto. The face of the spacer opposite to the grid 88 is open.

The filter units 46, 47 separated by the spacer members 48 are stacked over a plastic outlet pipe 90 shown in FIGS. 2 and 11 which extends through the center openings of the filter units and spacers. The pipe 90 has several rows of circumferentially spaced holes 91 formed through the wall of the pipe along its length. These holes in the pipe are located so that they are aligned in communication with the insides of the filter units 46, 47.

The filter assembly 45 is mounted inside the filter tank 16 by structure including a seal block 92 which is cemented to the outlet pipe 90 near its lower end. The seal block 92 is secured to the bottom plate 27 of the filter tank by bolts 93. A sealing gasket 103 is provided between the seal block 92 and the bottom plate 27. A spacer block 94 is provided above the seal block 92 and rests on a gasket 95.

A flotation collar 96 is located between the spacer block 94 and the bottom filter unit 47. As shown, another sealing gasket 97 is provided between the flotation collar 96 and the spacer block 94. The flotation collar 96 comprises a pair of spaced, parallel rings, 98, 99. The rings 98, 99 are spaced apart by an outer band 100 and a hub 101 so as to define an annular air chamber 102. The members 98–101 are preferably made from an acid-resistant material such as polypropylene or the like, and are welded together in a leak-proof manner so that the air trapped inside the chamber 102 will not escape.

A releasable lock-up assembly 110 is provided at the upper end of the outlet pipe 90. As shown in FIG. 11, a bushing or plug 111 is located within and closes the upper end of the pipe. The bushing 111 may be held in the pipe by a pin 112. A lock-up screw 113 is fastened to the outer end of the bushing 111 by a pin 114. A nut 115 provided with an operating handle 116 is adapted to be threaded along the screw 113. A collar 119 having sealing gaskets 117 on either face is located between the nut 115 and the upper filter unit 46.

When it is desired to clean or replace any of the filter units 46, 47, the cover plate 26 of the filter tank is removed and the nut 115 is threaded from the screw 113. When the nut 115 has been released, the flotation collar 96 urges the assembly of filter units and spacers upwardly in the tank. Each filter unit is successively brought to the top of the tank where it can be serviced or replaced. This configuration eliminates the need to reach into the liquid to retrieve the filter assembly. When the maintenance has been completed, it is only necessary to thread the nut 115 onto the screw 113 in order to move the assembly of filter units and spacers back to the position illustrated in FIG. 2 where the flotation collar 96 is next to the block 94 at the bottom of the tank.

Figure 12:
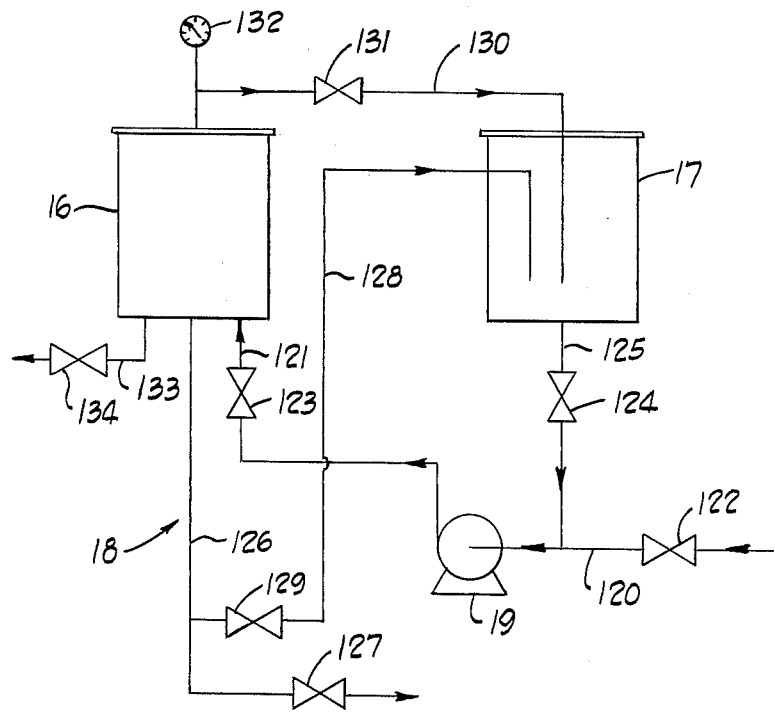
FIG. 12 is a diagrammatic illustration of the filtering apparatus of FIG. 1.

Reference is now made to FIG. 12 which schematically illustrates a representative filtering system 15 including the conduit connections 18 and associated valves. The plating solution is supplied to the pump 19 through a pipe 120 and is pumped into the tank 16 through a pipe 121 connected to the tank inlet. Valves 122, 123 are disposed in the lines 120, 121, respectively. The filter media slurry contained in the tank 17 is supplied to the filter tank 16 through a valve 124 in a pipe 125. The pipe 125 is connected to the pipe 120 at the inlet side of the pump 19.

The filtered liquid in the tank 16 flows out through the central outlet pipe 90 and through a pipe 126 to the plating bath. The pipe 126 is provided with a shut-off valve 127. A by-pass line 128 leading to the tank 17 is connected to the pipe 126 through a valve 129.

An overflow line 130 is connected to the tops of the tanks 16, 17. The overflow line 130 is provided with a valve 131 and a pressure gauge 132. A drain line 133 and valve 134 are connected to the bottom of the tank 16.

The filter assembly 45 in the tank 16 is conditioned for use by initially supplying it with filter media from the tank 17. This is accomplished by closing the valves 122, 127, 131 and opening the valves 123, 124, 129. As the slurry fills the tank 16, it flows radially inwardly through the openings 87 of the several spacers 48. The liquid entering each spacer flows up through the filter bag 61 of filter unit 46 above the spacer and down through the bag 60 of the adjacent lower filter unit. As the liquid passes through the bags 60, 61, the filter media is deposited and coalesces on the bag surfaces. The bottom surface filter media is maintained in place by the grid 88 attached to the spacer. The filtrate in each filter unit flows radially inwardly in the slots 51 to enter the pipe 90 through the holes 91 and then flows back to the tank 17 through the lines 126, 128 and the valve 129.

After the system has been conditioned by depositing the filter media on the bags 60, 61, the valves 124, 129 are closed and the valves 122 and 127 are opened to the flow of plating solution. The solution is pumped into the tank 16 with the valve 131 open. When an overflow occurs through the line 130, the valve 131 is closed and a pressure buildup of from 3–20 psi is experienced in the tank 16. The solution is filtered by flowing into the spacers 38 and through the upper and lower filtering surfaces of the units 46, 67.

It will be seen from the foregoing that the new construction of this invention achieves the objectives of providing an improved filter assembly characterized by individual filtering units each having upper and lower active filtering surfaces. The feature of the flotation collar 90 makes the assembly convenient to service and the bags 60, 61 further add to the ease of replacing individual elements of the assembly whenever necessary.

Many modifications and variations of the invention will be obvious to those skilled in the art in light of the foregoing detailed disclosure. Therefore, it will be understood that, within the scope of the appended claims, the invention can be practiced otherwise than as specifically shown and described.

What is claimed is:

1. Filter apparatus comprising:
  (a) a tank;
  (b) a plurality of filter units stacked in said tank, each of said units including filter bag means which define spaced filtering surfaces, and mesh material for supporting said bag means while permitting fluid flow through said surfaces;
  (c) spacer means interposed between said units for directing fluid to the filtering surfaces of adjacent filter units, and
  (d) outlet means extending through said filter units for receiving the filtrate from each unit;
  (e) said bags including a dish shaped filter surface including a circular outer wall bounded by an elastic lip for holding the filter surface in contact with a filter unit.

2. Filter apparatus as claimed in claim 1 wherein each of said filter units further comprises a plate having a center opening, and slots extending radially from said center opening, said mesh extending over the faces of said plate.

3. Filter apparatus as claimed in claim 1 wherein the mesh comprises an inner relatively coarse mesh layer and an outer relatively fine mesh layer.

4. Filter apparatus comprising:
  (a) a tank,
  (b) a plurality of filter units stacked in said tank, each of said units having two parallel, spaced horizontal filtering surfaces including a filter aid material;
  (c) spacer means interposed between said units including inlet openings to direct unfiltered liquid through the filtering surfaces of adjacent filter units and during a conditioning interval to allow said filter aid to coalesce on said filtering surfaces, each of said spacer means including a mesh surface that contacts and provides support over the bottom filtering surface of an adjacent unit after said aid material has passed through the mesh to said bottom filtering surface and coalesced due to pressure buildup within the tank, and (d) outlet means extending through said filter units for receiving the filtrate from each unit.

5. Filter apparatus as claimed in claim 1 or 4 wherein the outlet means further comprises a lock-up assembly attached to the pipe for maintaining the stacked filter units fixed within the tank and which further comprises flotation means positioned beneath said units for causing the units to rise to the surface of the liquid when said lock-up assembly is removed from the pipe.

6. Filter apparatus comprising:

(a) a tank;

(b) a plurality of filter units stacked in said tank and including a plate having a center opening and slots extending radially from the opening, two hubs attached to opposed surfaces of said plate, two double layer meshes attached to the opposed surfaces of the plate and to the hubs, and flexible filter bags covering the mesh and defining two opposed parallel filtering surfaces; the outside layer of said mesh providing a relatively fine mesh pattern to support said bags and the inner layer constructed of a relatively coarse mesh pattern to allow liquid flow to said slots;

(c) spacer means interposed between said filter units and including inlet openings through which unfiltered liquid and a filter aid material during preselected conditioning intervals enters the spacer for contacting said surfaces, said spacer means including one mesh configured parallel to a neighboring filter unit filtering surface to maintain a filter aid material in contact with the neighboring filter surface;

(d) outlet means including an outlet pipe extending through said units with openings between the faces of the plate of each filter unit for receiving the filtrate from each unit and a lock-up assembly attached to the pipe for maintaining the units in a fixed position about said pipe; and, (e) a flotation collar positioned about the pipe to cause the units to rise to the surface of the liquid within the tank when the lock-up assembly is removed from the pipe.

7. A filtering apparatus comprising:

(a) a filter tank;

(b) a plurality of filter units stacked in said tank, each of said units having two parallel, spaced filtering surfaces;

(c) spacer means interposed between said units for directing liquid through the filtering surfaces of adjacent filter units, (d) an outlet pipe extending through said filter units for receiving the filtrate from each unit;

(e) a lock-up assembly attached to the pipe for maintaining the stacked filter units fixed within the tank, and (f) annular flotation means positioned about the outlet pipe and further positioned beneath said filter units for causing the units to rise to the surface of the liquid when said lock-up assembly is removed from the pipe.

8. In a filtering tank including an inlet and an outlet pipe, a modular filter unit for providing dual filtering surfaces to a fluid within the tank comprising:

(a) a circular plate having a center opening to fit over the outlet pipe, and slots extending radially from the opening; said plate defining an outside diameter;

(b) two annular hubs attached to opposed surfaces of said plate;

(c) two double layer meshes attached to opposed surfaces of said plate and to the hubs; said meshes co-extensive in diameter with the outside diameter; and (d) two filtering materials, each comprising a dish shaped filter bag including a circular wall bounded by an elastic lip, a central aperture, and an annular gum washer attached to the bag with an inside diameter co-extensive with the outside diameter of the central aperture; a first of said materials fitting over a first of said double layer meshes with its gum washer contacting a first hub and its circular wall contacting the outside diameter of the plate and maintained in place by a first elastic lip contacting a second of said double layer meshes near said outside diameter; the second of said filtering materials fitting over the second of said double layer meshes with its gum washer contacting a second of said hubs, the second circular wall contacting the circular wall of said first material and a lip contacting an outer surface of said first material to maintain the two filtering materials in a filtering position.

* * * * *